United States Patent Office 3,382,041
Patented May 7, 1968

3,382,041
PROCESS FOR THE MANUFACTURE OF AZINES FROM WHICH HYDRAZINE AND ITS SALTS MAY BE PREPARED
Brian John Needham and Michael Arthur Smith, Loughborough, England, assignors to Whiffen & Sons Limited, Leicestershire, England
No Drawing. Filed Apr. 18, 1966, Ser. No. 543,047
Claims priority, application Great Britain, Apr. 23, 1965, 17,161/65
19 Claims. (Cl. 23—50)

ABSTRACT OF THE DISCLOSURE

Azines, particularly hydrazines, are prepared in a two step process by first reacting aqueous hypochlorite and aqueous ammonia to form chloramine and then reacting the thus formed chloramine with a carbonyl compound and aqueous ammonia to form the azine. The azine is then hydrolyzed to form a hydrazine.

The present invention relates to an improved process for the manufacture of azines which are useful in the manufacture of hydrazine and its salts.

The Raschig synthesis for the manufacture of hydrazine is well known and is still widely used. The synthesis is based on the reaction of aqueous sodium hypochlorite with ammonia to form chloramine, which is then reacted with excess of ammonia to form hydrazine. It is difficult to obtain high yields by this process due to side reactions which occur, the most important of which is the reaction of chloramine and hydrazine to form ammonium chloride and nitrogen. One method which has been proposed to overcome this difficulty is to protect the hydrazine by carrying out the reaction in the presence of a carbonyl compound. However, this process is not without difficulties and in order to obtain optimum yields it is essential to control the reaction temperature within narrow limits. Furthermore, intense agitation is required and the process cannot readily be carried out continuously without a significant reduction in yield.

It has now been found that these difficulties can be overcome by carrying out the reaction in two separate stages, the first stage comprising the reaction of aqueous hypochlorite with aqueous ammonia to form chloramine, and the second stage comprising the reaction of the chloramine with ammonia in the presence of a carbonyl compound. The product in these reactions is the azine corresponding to the carbonyl compound used. Yields of 95–98% can readily be achieved in both batchwise and continuous operations.

In the first stage of the process, a single reaction takes place, which for simplicity based on sodium hydrochlorite, may be represented as follows:

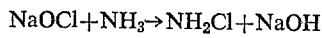

$$NaOCl + NH_3 \rightarrow NH_2Cl + NaOH$$

In the second stage of the process, three sequential reactions take place, for convenience shown below using methyl ethyl ketone as the carbonyl compounds, viz.

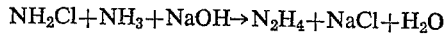

$$NH_2Cl + NH_3 + NaOH \rightarrow N_2H_4 + NaCl + H_2O$$

$$N_2H_4 + (CH_3)(C_2H_5)C=O \rightarrow$$
$$(CH_3)(C_2H_5)C=N-NH_2 + H_2O$$

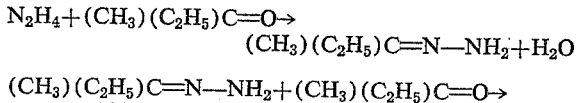

$$(CH_3)(C_2H_5)C=N-NH_2 + (CH_3)(C_2H_5)C=O \rightarrow$$
$$(CH_3)(C_2H_5)C=N-N=C(C_2H_5)(CH_3) + H_2O$$

Accordingly the present invention is for a process for the manufacture of azines which comprises a first stage wherein aqueous hypochlorite is reacted with aqueous ammonia in the absence of carbonyl compounds to form chloramine and a second stage wherein the formed chloramine is reacted with a carbonyl compound and aqueous ammonia to form the azine.

The aqueous hypochlorite may be any hypochlorite salt such as sodium hypochlorite, potassium hypochlorite, calcium hypochlorite and the like. It is most conveniently and cheaply sodium hypochlorite (NaOCl), aqueous solutions of which are commercially available under the common name "bleach."

For simplicity, the following detailed description relates to the use of bleach (sodium hypochlorite), and the concentrations and ratios are based on the amount of sodium hypochlorite present in the aqueous solution of bleach.

In the first stage of the reaction chloramine can be prepared quantitatively from bleach and ammonia of various concentrations. The yield depends on the concentrations used as well as the temperature, the mole ratio of ammonia to bleach and the contact time. The concentration of the bleach suitably lies between 1 and 30% by weight and is preferably between 4 and 9% by weight. The concentration of the aqueous ammonia can be from 1% to 50% by weight and is preferably 8–35% by weight. Where the more concentrated bleach solutions are used it is preferred to employ more dilute ammonia solutions or greater volumes of the ammonia solution, so as to ensure adequate dilution. The mole ratio of ammonia to bleach can be from 1:1 to 30:1 and even higher, although desirably for economic reasons any unnecessary excess of ammonia will be avoided. Although the temperature is not very critical, the temperature required for optimum results is related to the bleach and ammonia concentrations; in general the reaction may proceed at temperatures from 0° to ambient temperature. However with bleach concentrations greater than 6%, it is preferred to operate at lower temperatures (e.g. about 0° C.) and/or with higher ammonia/bleach ratios.

Solely by way of example, the effect of varying these conditions in the first stage of the process, will now be shown. The concentrations referred to are by weight. Thus with bleach of 3–5% concentration and ammonia of 4–10% concentration in a mole ratio of ammonia to bleach of 2:1, quantitative yields of chloramine are obtained at ambient temperature. When using bleach of 6–10% concentration and ammonia of 15–25% concentration quantitative yields may be obtained at 0° C. with ammonia to bleach mole ratios of 1:1, but at ambient temperature the ammonia to bleach mole ratio has to be increased e.g. to 15:1 if quantitative yields are to be obtained. When using bleach of 15% concentration and ammonia of 15–25% concentration quantitative yields are obtained at 0° C. with ammonia to bleach mole ratios of 20:1. When using bleach of 9% concentration and ammonia of 35% concentration quantitative yields are obtained at 0° C. with ammonia to bleach mol ratios of 10:1. When using bleach of 4% concentration and ammonia of 8% concentration quantitative yields are obtained at ambient temperature with ammonia to bleach mol ratios of 2:1, however, if the ammonia concentration is increased to 30%, with 4% bleach, at ambient temperature a mol ratio of 20:1 is required to obtain quantitative yields.

Investigation of the chloramine formation shows that it is virtually instantaneous, even at the lower temperatures. Decomposition sets in, however, fairly quickly, especially with the more concentrated chloramine solutions, and it is, therefore, important to feed the chloramine solutions, and it is, therefore, important to feed the chloramine solution to the second stage as quickly as possible and for example, within 1 minute and preferably within 10 seconds. The residence time will obviously depend on flow rates etc. but must be adjusted to allow complete formation of chloramine but not to allow decomposition to occur.

In the second stage of the reaction to obtain high yields of azine the total mole ratio of ammonia to bleach (i.e. ammonia in the first and second stage) should lie within the range of about 10:1 to 100:1 and preferably between 15:1 to 25:1. Thus, it may be necessary to add further ammonia to the second stage depending on the amount used in the chloramine formation.

The carbonyl compounds used in the second stage may be a ketone or aldehyde of the formula:

wherein $R^1$ is hydrogen or alkyl, preferably containing 1 to 4 carbon atoms such as methyl, ethyl, propyl or butyl; $R^2$ is alkyl, preferably containing 1 to 4 carbon atoms such as for example methyl, ethyl, propyl or butyl; aryl such as phenyl; or wherein $R^1$ and $R^2$ together with the carbon atom of the carbonyl group form a cycloaliphatic ring. Examples of suitable carbonyl compounds are acetaldehyde, propionaldehyde, methyl isobutyl ketone, diethyl ketone, benzaldehyde and cyclohexanone. Preferably the carbonyl compound is acetone or methyl ethyl ketone.

Preferably at least 2 moles, for example 2 to 3 moles, of carbonyl compounds are used per mole of hydrazine formed. Greater amounts of this may be used if desired, but this would be unnecessarily expensive.

The second stage may be carried out at temperatures up to boiling point of the ketone at the pressure employed and is suitably carried out at a temperature in excess of 30° C., for example in the range 30–55° C., or higher. In this second stage, the reactions forming hydrazine and hydrazone, are fast and complete within 30 seconds at temperatures of 35° C. or above. However, the rate of conversion of hydrazone to azine is slower, but increases with temperature, and consequently the higher temperatures, for example 40–55° C., are preferred. The residence time required for conversion is thus dependant on the temperature, and an adequate residence time for complete conversion should be used. For example, with temperatures of 35° C., a residence time of 12 minutes is suitable; with temperatures of 55° C., a residence time of 6 minutes is suitable.

Each step of the process may be operated at atmospheric pressure on elevated pressures. If superatmospheric pressures are used, the pressure is suitably not more than 20 atmospheres above atmospheric pressure. Where temperatures over 50° C. are used, pressure is required to maintain the ammonia in solution.

An agent such a gelatin or ethylenediamine tetraacetic acid may be used to sequester any ions which interefere with the second stage of the reaction, although this is not essential.

The process may be carried out batchwise or continuously. Even for batchwise operation, it is desirable for the ammonia and sodium hypochlorite to be reacted continuously and added continuously to the reactor in which the second stage is carried out. The chloramine is suitably added continuously at a slow addition rate.

It is a preferred feature of the process that this is carried out continuously. In such a continuous process, it is desirable for both the chloramine formed in the first stage and also the carbonyl compound used in the second stage to be introduced continuously into the second stage reactor, with or without the introduction of further ammonia.

The apparatus employed may be of various designs. The first stage of the process is suitably carried out in a Y tube, with the ammonia and bleach being fed to the two arms of the tube, and mixing at the point of interconnection, the formed chloramine issuing from the single leg of the tube. The dimensions of the Y tube are adjusted to give the desired residence time ( usually about 1 second) with the rates of flow employed. The formed chloramine may be fed continuously to a tank reactor, together with the appropriate carbonyl compound, or if desired to a series of tank reactors, with the product being continuously removed from the reactor.

Alternatively, the reaction may be carried out in a tubular reactor, in the first part of which aqueous sodium hypochlorite and aqueous ammonia are introduced, and in the second part of which the carbonyl compound is introduced, with or without the introduction of further ammonia, at the point corresponding to the completion of chloramine formation. This will be related to rates of flow, etc., and in general will correspond to a contact time in the first stage of about 1.5 seconds. The second part of the tubular reactor is suitably jacketed so that the second stage may be carried out at a higher temperature than the first stage.

The azine which is formed by the process of the present invention may be readily conperted into hydrazine, hydrazine hydrate or hydrazine salts by hydrolysis. Thus the azines can be readily converted to hydrazine salts by treatment with an acid such as hydrochloric acid or sulphuric acid or may be converted directly to hydrazine hydrate for example by distillation, suitably under pressure or may be converted by treatment with cation exchange resins. The invention consequently provides a very effective and economic method of mamking hydrazine, hydrazine hydrate and hydrazine salts.

The following examples are given to illustrate the process of the present invention. Percentages are by weight.

Example 1

Aqueous sodium hypochlorite of 5.4% concentration was continuously mixed at room temperature in a Y-tube of 1 mm. internal diameter with aqueous ammonia of 20% concentration, the mole ratio of sodium hypochlorite to ammonia being 1:20, and the contact time being 1.5 seconds. The product was run at a rate of 0.5 mole per hour of chloramine into a stirred reactor containing acetone and aqueous ammonia (20% concentration), the temperature being maintained at 35° C. The acetone to hypochlorite and the overall ammonia to hypochlorite mole ratios were 2.5:1 and 25:1 respectively. Acetazine was obtained in 97% yield.

Sulphuric acid was added to the reaction product so that the final pH was 1–2; the solution was cooled and the precipitated monohydrazine sulphate filtered off.

Example 2

Aqueous sodium hypochlorite of 8% concentration was continuously mixed at room temperature in a Y-tube of 1 mm. internal diameter with aqueous ammonia of 25% concentration, the mole ratio of sodium hypochlorite to ammonia being 1:20 and the contact time 1.5 seconds. The product was run at a rate of 0.3 mole per hour of chloramine into a stirred reactor containing methyl ethyl ketone, aqueous ammonia and gelatine solution at 35° C. The ketone to hypochlorite and overall ammonia to hypochlorite mole ratios were 3:1 and 25:1 respectively. Methyl ethyl ketazine was obtained in 96% yield.

The methyl ethyl ketazine was distilled from the aqueous reaction solution, dissolved in water, and fed to a pressure distillation column and distilled at 180° C. under a pressure of 150 pounds per square inch. The methyl ethyl ketone was recovered from the top of the column, and hydrazine hydrate, free from ketone, recovered from the bottom of the column.

Example 3

Aqueous sodium hypochlorite of 8% concentration was continuously mixed at room temperature in a Y-tube of 1 mm. internal diameter with a 20% aqueous ammonia solution in the mole ratio of 1:20, the contact time being 1.5 seconds. The resulting chloramine solution was added to the vigorously stirred reactor fitted with an overflow at a rate of 0.3 mole per hour. Methyl ethyl ketone was continuously added to the flask at 0.6 mole per hour, through a line adjacent to the Y-tube. The temperature in the stirred reactor was maintained between 50 and 55° C. Methyl ethyl ketazine was obtained in 95% yield.

The reaction product was extracted with methyl ethyl ketone in a liquid/liquid extractor; the organic phase was separated, and freed from ammonia by degassing under reduced pressure. The resulting solution was mixed with an equal volume of water and raised to boiling temperature with the sulphonated polystyrene resin cross-linked with divinyl benzene commercially available as Zeo-karb-225, in amount comprising 40 parts per mol of hydrazine, and then cooled. The resin was filtered off, washed with water, and the hydrazine eluted with aqueous ammonia, as an aqueous solution of hydrazine hydrate.

We claim:
1. A process for the manufacture of azines which comprises a first stage wherein aqueous hypochlorite is reacted with aqueous ammonia in the absence of carbonyl compounds to form chloramine and a second stage wherein the formed chloramine is reacted with a carbonyl compound and aqueous ammonia to form the azine of the carbonyl compound used.
2. A process as claimed in claim 1, where in the first stage of the process the concentration of aqueous hypochlorite is in the range 1 to 30% by weight.
3. A process as claimed in claim 2, where in the first stage of the process the concentration of aqueous hypochlorite is in the range 4 to 9% by weight.
4. A process as claimed in claim 1 where in the first stage of the process the concentration of ammonia in the aqueous ammonia is in the range 1 to 50% by weight.
5. A process as claimed in claim 4 where in the first stage of the process the concentration of ammonia in the aqueous ammonia is in the range 8 to 35% by weight.
6. A process as claimed in claim 1 where in the first stage of the process the mole ratio of ammonia to aqueous hypochlorite is in the range 1:1 to 30:1.
7. A process as claimed in claim 1 wherein the first stage of the process is carried out at a temperature between 0° C. and ambient temperature.
8. A process as claimed in claim 1, wherein the aqueous hypochlorite concentration is greater than 6% and the first stage is carried out at about 0° C.
9. A process as claimed in claim 1 wherein the chloramine formed in the first stage is fed within one minute to the second stage of the process.
10. A process as claimed in claim 1 where in the second stage of the process, the totalled mole ratio of ammonia used in the first and second stages to aqueous hypochlorite lies in the range 10:1 to 100:1.
11. A process as claimed in claim 10 where in the second stage of the process, the totalled mole ratio of ammonia used in the first and second stages to aqueous hypochlorite lies in the range 15:1 to 25:1.
12. A process as claimed in claim 1 wherein the second stage of the process is carried out at a temperature between about 30 to 55° C.
13. A process as claimed in claim 12 wherein the second stages of the process is carried out at a temperature in the range 40–55° C.
14. A process as claimed in claim 1 wherein in the first stage the ammonia and aqueous hypochlorite are reacted continuously and the formed chloramine added continuously to the second stage of the process.
15. A process as claimed in claim 1 wherein both first and second stages are carried out as a continuous process.
16. A process as claimed in claim 15 wherein the chloramine formed in the first stage of the process and the carbonyl compound with additional ammonia, are introduced continuously into the reaction zone for the second stage of the process.
17. A process as claimed in claim 1 wherein in the first stage of the process the aqueous hypochlorite and ammonia are reacted together in a Y-tube.
18. A process for the preparation of hydrazine, hydrazine hydrate, and hydrazine salts which comprises a first stage wherein aqueous hypochlorite is reacted with aqueous ammonia in the absence of carbonyl compounds to form chloramine, a second stage wherein the thus-formed chloramine is reacted with a carbonyl compound and aqueous ammonia to form the azine of the carbonyl compound, and then converting the thus-formed azines into hydrazine, hydrazine hydrate, or hydrazine salts by hydrolysis.
19. A process for the preparation of azines which comprises a first stage wherein sodium hypochlorite is reacted with aqueous ammonia in the absence of carbonyl compounds to form chloramine and a second stage wherein the formed chloramine is reacted with a carbonyl compound and aqueous ammonia to form the azine of the carbonyl compound used.

References Cited

UNITED STATES PATENTS 3,332,739    7/1967    Needham et al. _____ 23—190

FOREIGN PATENTS 598,776    5/1960    Canada.

EDWARD J. MEROS, *Primary Examiner.*

MILTON WEISSMAN, *Examiner.*

H. S. MILLER, *Assistant Examiner.*